(12) United States Patent
Courtright et al.

(10) Patent No.: US 6,651,156 B1
(45) Date of Patent: Nov. 18, 2003

(54) MECHANISM FOR EXTENDING PROPERTIES OF VIRTUAL MEMORY PAGES BY A TLB

(75) Inventors: David A. Courtright, Los Gatos, CA (US); Lawrence H. Hudepohl, Saratoga, CA (US); Kevin D. Kissell, Le Bar sur Loup (FR); G. Michael Uhler, Menlo Park, CA (US)

(73) Assignee: MIPS Technologies, Inc., MountainView, CA (US)

( * ) Notice: Subject to any disclaimer, the term of this patent is extended or adjusted under 35 U.S.C. 154(b) by 159 days.

(21) Appl. No.: 09/822,783

(22) Filed: Mar. 30, 2001

(51) Int. Cl.$^7$ ................................................ G06F 12/10
(52) U.S. Cl. ...................... 711/207; 211/156; 211/208
(58) Field of Search ................................ 711/205, 206, 711/207, 208, 154, 156, 133, 138, 139, 141

(56) References Cited

U.S. PATENT DOCUMENTS

| | | | |
|---|---|---|---|
| 5,628,023 A | 5/1997 | Bryant et al. | |
| 6,260,131 B1 | 7/2001 | Kikuta et al. | |
| 6,304,944 B1 * | 10/2001 | Pedneau | 711/139 |
| 6,351,797 B1 | 2/2002 | Beard, Sr. et al. | |
| 6,408,373 B2 * | 6/2002 | Burger et al. | 711/207 |
| 6,412,043 B1 | 6/2002 | Chopra et al. | |
| 6,418,523 B2 * | 7/2002 | Porterfield | 711/207 |
| 6,430,664 B1 * | 8/2002 | Chauvel et al. | 711/168 |
| 6,430,670 B1 * | 8/2002 | Bryg et al. | 711/216 |

FOREIGN PATENT DOCUMENTS

| | | |
|---|---|---|
| EP | 115877 A2 | 8/1984 |
| EP | 425771 A2 | 5/1991 |

OTHER PUBLICATIONS

"Compatibility of Access Control Lists and Permission Bits in AIXV3" IBM Technical Disclosure Bulletin, IBM Corporation New York, US, vol. 34, No. 7B. Dec. 1, 1991, pp. 127–129.

* cited by examiner

*Primary Examiner*—Gary J Portka
(74) *Attorney, Agent, or Firm*—Richard K. Huffman; James W. Huffman (57) ABSTRACT

An apparatus and method are provided that enable a central processing unit (CPU) to extend the attributes of virtual memory beyond that which an existing translation lookaside buffer within the CPU is capable of storing while at the same time preserving compatibility with legacy operating system software. The apparatus includes a translation lookaside buffer and extended attributes logic. The translation lookaside buffer (TLB) stores a plurality of TLB entries. Each of the TLB entries has an extended memory attributes index field. The extended attributes logic is coupled to the TLB. The extended attributes logic employs the extended memory attributes index field to access one of a plurality of extended memory attributes registers that is external to the TLB. Contents of the extended memory attributes register prescribe specific extended properties for a corresponding virtual memory page. The extended memory attributes index field is a field that is also employed by a legacy memory management protocol to prescribe legacy properties. The plurality of extended attributes registers are initialized to states that correspond to the legacy properties so that the CPU is compatible with operating systems employing the legacy memory management protocol.

19 Claims, 3 Drawing Sheets

FIG. 1 (Related Art)

Conventional Virtual Memory Management

FIG. 3

*TLB Entry Register*

FIG. 4

*EMA Register Format*

FIG. 5

*Alternative EMA Register Format*

MECHANISM FOR EXTENDING PROPERTIES OF VIRTUAL MEMORY PAGES BY A TLB

CROSS-REFERENCE TO RELATED APPLICATIONS

This application is related to U.S. patent application Ser. No. 09/822,796 pending, entitled, Mechanism to Extend Computer Memory Protection Schemes, having a common assignee, common inventors, and filed on the same date as this application.

BACKGROUND OF THE INVENTION

1. Field of the Invention

This invention relates in general to the field of memory management within a computing system, and more particularly to an apparatus and method for extending the properties of virtual memory pages above and beyond those provided for by an existing translation lookaside buffer architecture.

2. Description of the Related Art

Early computing systems executed application programs that were composed especially to run on those systems. The programs consisted of a sequence of instructions that were loaded into the memory of the computing system at the time of execution. Address logic within the computing system would generate a memory address each time an instruction was fetched from the memory for execution. Access logic within the computing system would place the memory address out on a memory address bus and the memory would provide the contents of the memory location corresponding to the memory address for execution by the computing system. In addition to program instructions, the early computing systems employed memory locations to temporarily store data that was used by application programs. And like the retrieval of program instructions for execution, the storage and retrieval of program data involved the generation of memory addresses that corresponded to data memory locations.

The memory addresses generated by the address logic were directly routed to the early computing systems' memory busses to access corresponding memory locations. Hence, to access location 10513BC7h in memory required that the address logic generate address 10513BC7h and issue this address to the memory bus. But stated differently, it also is true that when the address logic generated address 10513BC7h, the memory location to which this address corresponded was also location 10513BC7h.

It is intuitive to observe that a direct, one-to-one correspondence between memory addresses generated by a program executing on an early computing system and locations in the computing system's memory was quickly deemed disadvantageous from many standpoints. First, in order to execute a wide variety of application programs, it was required that the early computing system always provide memory that spanned the full address range of the system. Second, such correspondence unnecessarily coupled the architecture of the computing system to the tools that were used to produce and execute programs on the system. For instance, programs required modifications in order to execute on computing systems that exhibited different memory ranges and constraints. And finally, as computers progressed to the point of providing time-share (i.e., multi-tasking) operating systems, performance degradations were observed since all memory management and protection functions had to be performed by the operating systems.

Virtual memory techniques were developed during the mid-1970's specifically to address the above-noted problems. Stated briefly, a virtual memory "manager" within a computing processing unit (CPU) served as an intermediary between address generation logic in the CPU and access logic that accessed memory locations. Under a virtual memory management scheme, a "virtual address" generated by the address logic was "translated" according to a pre-defined and configurable mapping strategy into a "physical address" that was placed on the memory bus to access a corresponding memory location. Hence, virtual memory management solved the problem of one-to-one correspondence.

Virtual memory management techniques continue to provide benefits today that enable the operating system of a computing system to effectively control where application programs are loaded and executed from memory in addition to providing a means whereby memory can be assigned to a program while it is running and then released back into the memory pool when the memory is no longer necessary. Most virtual memory management units today divide a system's virtual memory into equal-sized chunks called memory pages. To access a memory page requires translation of the upper bits of a virtual address; the lower bits of the virtual address are not translated and merely represent an offset into a page.

Virtual memory management not only applies to the locations associated with memory, but also to the properties, or attributes, associated with those locations. For instance, a virtual page may be designated for reads only so that data writes to locations in the page can be precluded.

The virtual-to-physical address mapping information, along with information specifying the attributes of virtual memory pages, are stored in a designated area of memory known as a page table. Generally speaking, a page table contains one entry for each virtual memory page within the address space of a CPU. Hence, for each memory access, it is required that the page table entry associated with the access be retrieved so that the virtual address can be translated into a physical address and so that access attributes can be determined.

Translation lookaside buffers (TLBs) were incorporated into CPU designs for the express purpose of storing frequently used page table entries within a CPU so that memory accesses are not required each time an address is generated. A TLB is a very fast memory providing storage for a number of page table entries. TLBs are designed to be efficient and fast because they typically lie in the critical timing path of a CPU. Accordingly, only those information bits that are essential to the translation of addresses and specification of memory page attributes are provided in a page table entry within a TLB.

TLBs are streamlined to support rapid access for the translation of addresses. As a result, however, the structure of a given TLB is quite static, yielding little or no room for expansion. Hence, if it is desired to update the design of a CPU to incorporate a newly developed or expanded set of memory properties, then it is highly probable that the design of the CPU's TLB must be modified to provide for expression of the properties at the virtual page level. But for CPU's that have relegated TLB management tasks to operating system software, changing the structure of an existing TLB creates incompatibilities with the operating system software—the operating system must be updated in order to provide for memory management according to the new/expanded memory properties.

A significant market segment is lost, however, when an upgraded CPU becomes no longer compatible with an older operating system and its application programs. CPU manufacturers desire, at least, that CPU upgrades retain compatibility with older software. But compatibility retention in the case of a software-managed TLB architecture implies that the number of virtual memory attributes that are provided in a upgraded design be limited by the existing TLB structure. In other words, to retain compatibility with an older operating system means that little or no virtual page management features can be implemented in an upgraded CPU design.

Therefore, what is needed is an apparatus that allows expanded memory attributes to be provided via an existing TLB design, where the number of attributes exceeds the structure of the TLB, and where the structure of the TLB is maintained for compatibility with legacy software.

In addition, what is needed is a mechanism for extending the properties of virtual memory pages that utilizes an existing TLB structure.

Furthermore, what is needed is a CPU apparatus that allows more virtual memory page properties to be exercised than what an existing TLB structure accommodates, where the TLB structure also is backwards compatible with older operating system software.

Moreover, what is needed is a method for extending virtual memory page properties beyond the capacity of an existing TLB, but which defaults to states that can be interpreted by legacy applications software.

SUMMARY OF THE INVENTION

The present invention provides a superior technique for extending the properties of virtual memory pages beyond that provided for by an existing translation lookaside buffer (TLB). The properties of the virtual memory pages are extended according to the present invention without any detrimental impact on the structure of the TLB or any of the entries therein. The property extensions are provided for by the present invention in such a manner as to allow backwards compatibility with TLB management software in legacy operating systems.

In one embodiment, an apparatus is provided for specifying extended properties for virtual memory pages. The apparatus has a translation lookaside buffer (TLB) and extended attributes logic. The translation lookaside buffer (TLB) stores a plurality of TLB entries, each of the plurality of TLB entries having an extended memory attributes index field, where the extended memory attributes index field prescribes legacy properties according to a legacy memory management protocol, and where the legacy properties comprise legacy cache management policies. The extended attributes logic is coupled to the TLB. The extended attributes logic employs the extended memory attributes index field to access one of a plurality of extended memory attributes registers that is external to said TLB, where the extended memory attributes index field designates the one of the plurality of extended memory attributes registers, and where contents of the one of the plurality of extended memory attributes registers prescribe specific extended properties for a corresponding virtual memory page. The plurality of extended memory attributes registers have initialization states that correspond to the legacy properties. The one of the plurality of extended memory attributes registers indicates an initialization legacy property that corresponds to the extended memory attributes index field.

One aspect of the present invention features a mechanism in a microprocessor for enabling a translation lookaside buffer (TLB) to extend the properties of virtual memory pages. The mechanism has an extended properties register array, for specifying a plurality of extended virtual page properties, and a memory management unit that is coupled to the extended properties register array. The memory management unit accesses the virtual memory pages. The memory management unit includes TLB entries and extended attributes logic. The TLB entries prescribe the properties of the virtual memory pages, where an extended memory attributes field within each of the TLB entries designates a corresponding register within the extended properties register array, and where the extended memory attributes field specifies legacy virtual page properties according to memory management rules employed by a legacy operating system. The extended attributes logic is coupled to the TLB entries. The extended attributes logic accesses the corresponding register to determine one of the plurality of extended virtual page properties that applies for accesses to a particular virtual memory page. The corresponding register is initialized to indicate specific legacy virtual page properties that correspond to contents of the extended memory attributes field according to the memory management rules.

Another aspect of the present invention contemplates a computer program product for use with a computing device. The computer program product has a computer usable medium, with computer readable program code embodied in the medium, for causing a CPU to be described, the CPU being capable of accessing virtual memory pages according to extended page properties. The computer readable program code includes first program code, second program code, and third program code. The first program code describes a translation lookaside buffer (TLB), where the TLB is configured to store TLB entries, each of the TLB entries having an extended page properties field, where the extended page properties field, according to a legacy operating system memory management protocol, prescribes page properties. The second program code describes extended attributes logic, where the extended attributes logic is configured to employ the extended page properties field to access an extended attribute register that is external to the TLB, and where contents of the extended attribute register determine the extended page properties for a particular virtual memory page, and where the extended attribute register is one of a plurality of extended attribute registers, and where the plurality of extended attribute registers is initialized to prescribe the legacy memory attributes according to the extended page properties field. The third program code describes a configuration register, wherein contents of the configuration register indicate whether or not the CPU is capable of providing the extended page properties.

Yet another aspect of the present invention provides a computer data signal embodied in a transmission medium. The computer data signal has first computer-readable program code, second computer-readable program code, third computer-readable program code, and fourth computer-readable program code. The first computer-readable program code describes a translation lookaside buffer (TLB), where the TLB is configured to store TLB entries, each having an extended page properties field. The second computer-readable program code describes extended memory attributes registers external to the TLB, where each of the extended memory attributes registers prescribes a set of extended attributes for accesses to virtual memory pages. The third computer-readable program code describes extended attributes logic, where the extended attributes logic is configured to employ the extended page properties field to access one of the extended memory attributes registers to determine a specific set of extended attributes whereby a specific virtual memory page is accessed, where the extended page properties field specifies legacy attributes for access to the virtual memory pages according to a legacy memory management protocol. The fourth computer-readable program code describes a configuration register, where contents of the configuration register indicate to an operating system that extended attributes features are available for use. The extended memory attributes registers are initialized to indicate the legacy attributes according to the legacy memory management protocol, and the one of the extended memory attributes registers is initialized to indicate particular legacy attributes corresponding to contents of the extended page properties field.

A further aspect of the present invention contemplates a method in a microprocessor for extending the properties of virtual memory pages over that provided for by existing translation lookaside buffer (TLB) entries. The method includes designating an existing field within each of the entries as an extended properties register index field and providing an array of extended properties registers external to the TLB that are indexed by the extended properties register index field; employing contents of the extended properties register index field to access a particular extended properties register within the array to extend the properties of a particular virtual memory page; initializing the array of extended properties registers so that they prescribe legacy properties as prescribed by contents of the extended properties register index field according to a legacy memory management protocol; and providing a configuration register in the microprocessor to indicate to an operating system that extended virtual page management features are available for employment. The employing includes first prescribing, within a first field of the particular extended properties register, an extended cache control policy for accesses to the particular virtual memory page; and second prescribing, within a second field of the particular extended properties register, an Instruction Set Architecture to be used for accesses to the particular virtual memory page.

BRIEF DESCRIPTION OF THE DRAWINGS

These and other objects, features, and advantages of the present invention will become better understood with regard to the following description, and accompanying drawings where.

DETAILED DESCRIPTION

In light of the above background on the techniques employed by present day computing systems to expedite tasks related to virtual memory management, a related art example will now be discussed with reference to FIG. 1. This example highlights the limitations of current virtual page management techniques, particularly with respect to the non-extendable structure of translation lookaside buffer (TLB) logic. The architecture of virtually all present day TLBs provides little room at most for expansion, and spare bits that are provided for expansion are generally allocated to accommodate address growth, not growth in other properties associated with virtual memory pages. Following this discussion, a detailed description of the present invention will be provided with reference to FIGS. 2 through 5. The present invention overcomes the present obstacles to extending the properties of virtual memory pages within a computing system by providing an apparatus and method for employing an extended properties register array to extend virtual memory page properties within a computing system that does not impact the computing system's existing TLB structure or the computing system's compatibility with legacy operating systems.

Figure 1:
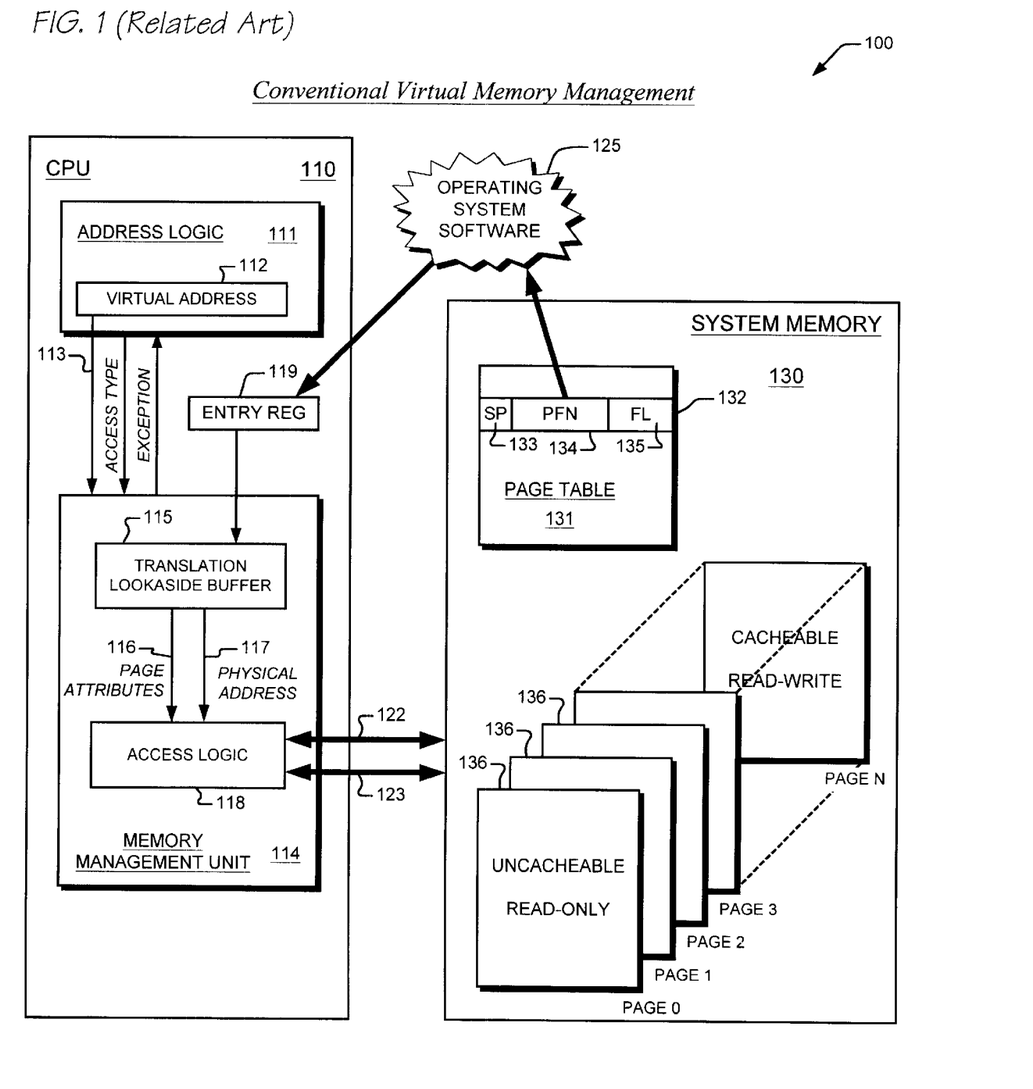
FIG. 1 is a block featuring a related art computing system that utilizes a translation lookaside buffer to expedite the management of virtual memory within the system.

Now referring to FIG. 1, a block diagram is presented featuring a related art computing system 100 that utilizes a translation lookaside buffer 115 to expedite the management of virtual memory 130. The computing system 100 includes a central processing unit (CPU) 110 that accesses system memory 130 via an address bus 122 and data bus 123. In some systems 100, the two busses 122, 123 are combined. The CPU 110, or microprocessor 110, has address logic 111 that provides a virtual address 112 (i.e., an address generated by an operating system 125 or application program executing on the system 100) to memory management logic 114 via bus 113. The memory management logic 114, or memory manager 114, has a translation lookaside buffer 115 for performing address translation and access logic 118 for accessing the system memory 130 via the address bus 122 and data bus 123. Within a virtual memory computing system 100, the system memory 130 is divided into a sequence of equal-sized memory pages 136, the most common size today being 4KB/page. Hence, a CPU 110 having a 32-bit address range split into 4KB memory pages 136 will manage the accessing of roughly 4 million pages 136. Certain pages 131 within memory 130 are specially designated to store all of the information that prescribes the translation of virtual addresses and other access features of each memory page 136. These specially designated pages 131 are called page tables 131. A page table 131 has entries 132 that correspond to each of the virtual memory pages 136.

The concept of virtual memory management allows the operating system software 125 to control how and where application programs are loaded into system memory 130 and how and where additional memory 130 is allocated to the programs. Virtual memory management techniques provide many advantages to a computing system 100 such as demand paging, address range extension, access protection, program relocation, memory allocation, and the ability to run multiple instances of the same application program. In general, the CPU 110 generates virtual program addresses 112 to access instructions and data in memory 130. From the point of view of a CPU 110, the system memory 130 contains all of the address locations that the CPU 110 is capable of generating. At one end of the spectrum, virtual memory management can be employed by operating system software 125 to allow application programs to run on the CPU 110 that span the full virtual address range of the CPU 110 while restricting the physical location of these programs to a small number of physical memory pages. This is done by translating (i.e., mapping) multiple virtual memory pages 136 to the same physical memory page. On the other extreme, an operating system 125 can use virtual memory techniques to run multiple instances of the same application program on the CPU 110 simultaneously, where each of the instances generate the same virtual addresses, yet each instance of the program is mapped to a different physical memory page than all of the other instances of the program. In addition to address translation, virtual memory management techniques enable operating systems to control the kinds of accesses that can be made to certain virtual memory pages 136. Note that virtual page 0 136 is designated as a read-only page that cannot be loaded into the CPU's memory cache (not shown). Similarly, virtual page N 136 is designated for both read and write accesses, and page N 136 can be loaded into the CPU's memory cache.

Operationally, the CPU's operating system 125 prescribes the contents of the page table 131. For each virtual memory page 136 in the system 100, a page table entry 132 is established. When the address logic 111 generates a virtual address 112 for the purposes of accessing memory 130, the virtual address 112 is provided to the memory management unit 114 via bus 113 along with the type of access that is being requested (e.g. execution read, data write, etc.) via signal ACCESS TYPE. The page table entry 132 in the page table 131 that corresponds to the virtual memory page 136 within which the virtual address 112 is found must be provided to the memory management unit 114. A typical page table entry 132 has a physical frame number (PFN) field 134, a flags (FL) field 135, and a spare bits (SP) field 133. The PFN field 134 provides the upper address bits of a physical address corresponding to a physical memory page to which the virtual address 112 is mapped. The FL field 135 contains bits that control access to the virtual memory page 136 such as read/write access, cache policy, data valid/invalid, etc. In some page table designs, the SP field 133 is provided to accommodate address growth so that the number of bits in the PFN field 134 can be increased in the future.

In summary then, virtual memory management essentially comprises replacing the upper address bits of an address generated by an application program. The bits that are replaced are called a virtual page number. The replacement bits are called a physical frame number 134. The lower address bits are called a page offset because they designate a memory location within a virtual or physical page. Properties, or attributes, or each virtual page 136, such as those noted above, are prescribed by bits within the FL field 135 of the page table entry 132 that corresponds to the virtual page 136.

The TLB 115 is a cache structure that retains a subset of the page table 131 within fast memory in the CPU 110 so that the operating system 125 does not have to access the page table 131 each time a virtual address 112 is generated. Less frequently used entries 132 are dropped from the TLB 115 and new entries 132 are fetched from the page table 131 when it is found that no entry 132 exists in the TLB 115 for a virtual address 112 that requires translation. The circumstance under which no corresponding entry 132 exists within the TLB 115 for a submitted virtual address 112 is known as a TLB miss. The fetching of the corresponding new entry 132 from the page table 131 is called a TLB fill. In a system 100 that allocates TLB management tasks to the operating system 125, a TLB miss typically causes an exception to be generated by the CPU 110, whereby the operating system 125 is informed of the miss. Accordingly, the operating system 125 fetches the appropriate page table entry 132 from the page table 131 and writes the entry data to a TLB entry register 119. The operating system then executes an instruction that causes the contents of the TLB register 114 to be written into the TLB 115.

In the ideal case, a TLB miss is never encountered, thus avoiding the delays associated with TLB fills. But the reality is that TLB misses occur frequently, and to minimize the delay caused by having to access memory 130 to perform an address translation, present day TLBs 115 are typically designed to be very fast. One implication of a streamlined TLB design is that the number of bits within a TLB entry (not shown) are minimized, so that only essential information about a given virtual page 136 is stored within the TLB 115. One skilled in the art will appreciate that the structure of page table entries 132 in a software-managed TLB environment need not be equivalent to the structure of a TLB entry within the TLB 115, however, for performance reasons, most operating systems 125 design their page table entries 132 to correspond to the structure of the TLB 115. Some entry registers 119 do provide spare bits, but typically these bits are those remaining bits within bytes or words that the operating system 125 would otherwise fetch from memory 130 as a matter of course during a TLB fill operation.

In more recent years, the architecture of CPUs 110 has become increasingly sophisticated and complex. And to preclude developmental and production errors, working portions of existing microprocessor designs are now being re-used in upgraded versions of the designs. As one skilled in the art will appreciate, one of the biggest problems that computer system designers must face today is that of maintaining compatibility with legacy software, both in terms of operating systems compatibility and compatibility with existing application programs. Hence, when an upgraded version of a CPU 110 is fielded, it is required not only to be compatible with newer operating system software and applications software that exploit features added to the CPU 110, but the CPU 110 must also be compatible with older, legacy operating system software 125 and applications software as well.

The present inventors have observed that legacy operating system software compatibility requirements have a detrimental impact on a CPU architecture 110 when management functions of a TLB 115 are allocated to operating system software 125. This is particularly true in those situations where a goal of a CPU upgrade is to extend the properties of virtual memory pages 136. The number of properties, or attributes, of virtual memory pages 136 has grown way in excess of what the entries within an existing TLB are capable of expressing. For example, if a designer desires to add a capability to a CPU 110 to implement any of the numerous cache management policies (e.g., write-through, write-back, etc.) on a virtual page basis, the information regarding those policies must be expressed within each TLB entry. Alternatively, if a multiple instruction set architecture (ISA) capability is added to an existing microprocessor design, it is required that the ISA mode for instructions/data within a virtual memory page 136 be designated by the corresponding page table entry 132 and recognized and processed by the memory management unit 114. ISA mode and cache policy management attributes are only two examples of the types of extended features that are currently under consideration for designation at the virtual page level. Other extended properties include virtual page access protection mechanisms such as the ability to designate a virtual page exclusively for instruction or data access operations.

Regardless of what extended properties are to be prescribed at the virtual memory page level, however, if there are not a sufficient number of spare bits within the entries of an existing TLB 115 to express the desired extended properties, or if existing spare bits are reserved for address growth or for some other reason, then a designer is forced to modify the design of the TLB 115 and TLB entry register 119 to provide for the expression of the desired extended properties for each virtual page 136. Yet, for systems 100 that rely upon operating system software 125 to perform virtual memory management tasks, changing the design of a TLB 115 instantly renders the systems 100 incompatible with legacy operating system software 125. In addition, one skilled in the art will appreciate that the timing associated with memory management logic 114 is always critical to the performance of a CPU 110 and, therefore, a requirement to load additional data from a page table 131 into an entry register 119 or to search TLB entries stored in a TLB 115 that have an increased number of bits is exceedingly detrimental to the CPU's performance. Consequently, to provide for extended virtual page attributes, the most common approach that is employed today is to redesign the memory management unit 114 to increase the attribute capacity of the TLB 115, thus sacrificing compatibility with legacy operating systems 125 in order to provide for a set of desired extended memory management features. This approach, however, is entirely unacceptable within segments of the art that insist upon backwards operating system compatibility. For these segments, designers are compelled to provide only those extended attributes that can be accommodated by the designed-in capacity of an existing TLB 115.

The present invention overcomes the limitations of existing designs described above by providing an apparatus and method whereby designers can increase the number of virtual page attributes beyond the capacity of an existing TLB 115 without having to sacrifice legacy operating system compatibility. The present invention will now be more specifically discussed with reference to FIGS. 2 through 5.

Figure 2:
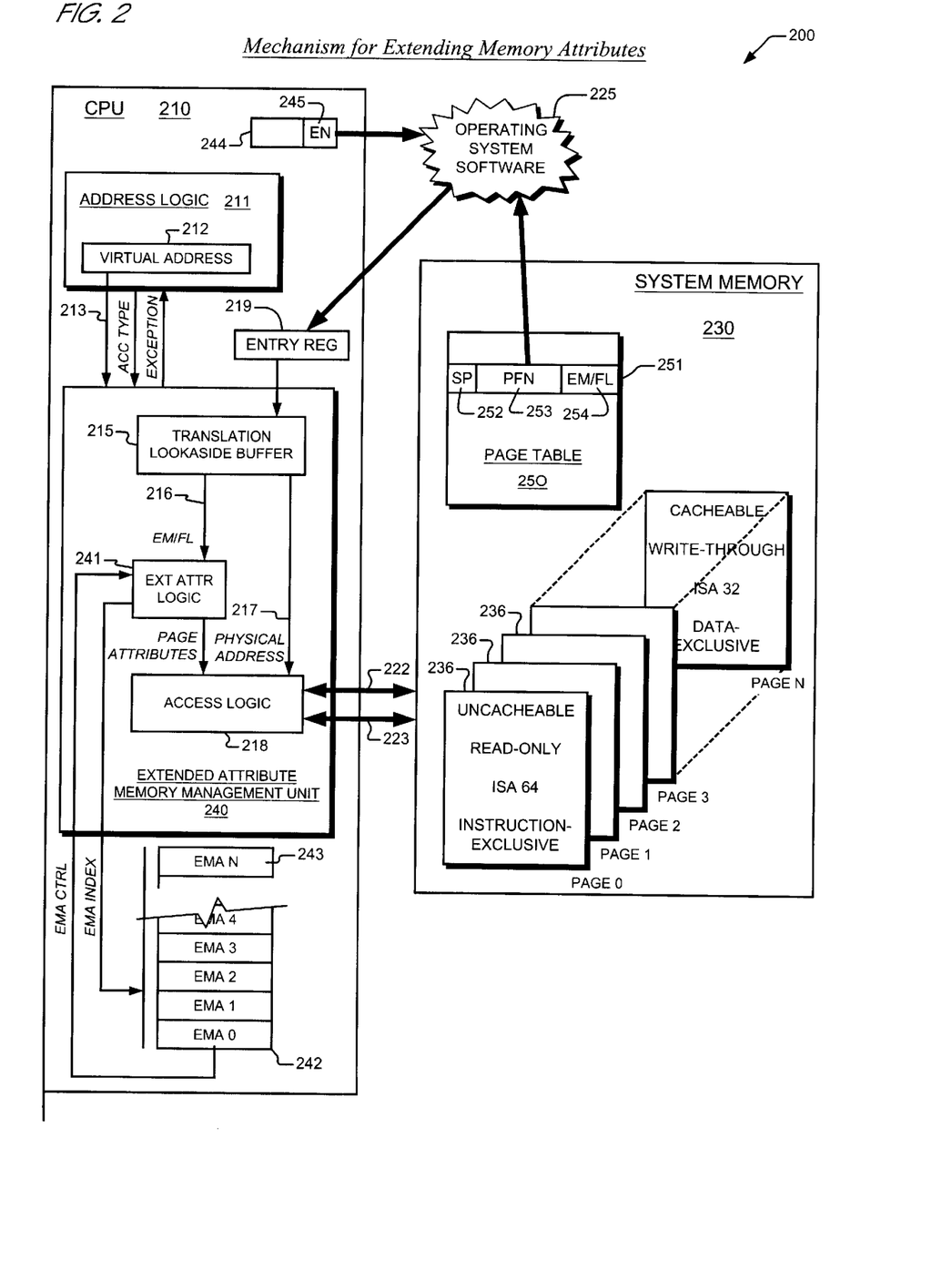
FIG. 2 is a block diagram illustrating a computing system according to the present invention that employs an existing translation lookaside buffer design to extend the properties of virtual memory within the system.

Referring to FIG. 2, a block diagram is presented illustrating a computing system 200 according to the present invention that employs an existing translation lookaside buffer design 215 to extend the attributes of virtual memory 230 within the system 200. The computing system 200 has a CPU 210 coupled to system memory 230 via an address bus 222 and data bus 223, or a combined address/data bus 222/223. The CPU 210 has address logic 211 that generates virtual addresses 212. The virtual addresses 212 are routed to an extended attribute memory management unit 240 via bus 213. The memory management unit 240 has a translation lookaside buffer 215 for performing virtual-to-physical address translation and access logic 218 for accessing the system memory 230 via the address/data bus 222/223. Entries within the TLB 215 are managed by operating system software 125 that loads entries via an entry register 219. The extended attribute memory management unit 240 also has extended attributes logic 241 that is coupled to the TLB 215 via an EM/FL bus 216. The CPU additionally has an extended memory attributes register array 242 that is coupled to the extended attributes logic 241 within the memory management unit 240. The extended attributes register array 242 has a plurality of extended memory attributes registers 243. The CPU 210 moreover includes a configuration register 244 that is readable by the operating system. The configuration register 244 has an extended memory attributes enabled (EN) field 245 indicating whether or not extended memory attributes functions are provided by the CPU 210.

The system memory 230 is divided into equal-sized virtual memory pages 236. In one embodiment, the pages 236 are 4KB in size. In an alternative embodiment, the size of the pages 236 can be prescribed as 4KB, 16KB, 64KB, 256KB, 1MB, 4MB, 16MB, or 64MB. The memory 230 has a page table 250 that contains a plurality of page table entries 251 corresponding to each of the virtual memory pages 236. Each page table entry 251 has a physical frame number (PFN) field 253 and an extended attributes/flags (EM/FL) field 254. In one embodiment, each page table entry 251 also has a spare bits (SP) field 252 to accommodate address growth.

In operation, elements of the computing system 200 according to the present invention function very similar to like-numbered elements of the computing system 100 of FIG. 1, the hundreds digit being replaced by a 2. The architecture of the TLB 215 and the TLB entry register 219 according to the present invention is exactly like that of their FIG. 1 counterparts. The differences, however, between the computing system 100 of FIG. 1 and the computing system 200 according to the present invention focuses on the manner in which the EM/FL field 254 of each page table entry 251 is loaded into the entry register, and processed and interpreted by the memory management unit 240.

The present invention provides the configuration register 244 having extended memory attributes (EMA) enabled (EN) bit 245 that can be read by operating system software 225. The EN field 245 indicates to the operating system 225 whether the CPU 210 is capable or not of exercising extended memory attributes. In addition, each of the extended memory attributes (EMA) registers 243 within the EMA register array 243 is configured with a set of extended memory attributes that pertain to corresponding virtual memory pages 236 in the system 200. In one embodiment, there are eight EMA registers 243 within the EMA array 242.

The extended attributes logic 241 employs the contents of the EM/FL field 254 of a TLB entry as an index into the EMA register array 242 to select a specific EMA register 243 that contains extended attributes for a corresponding virtual memory page 236. The EM/FL field 254 contains the same number of bits as the FL field 135 in a legacy CPU 110. Furthermore, each of the EMA registers 243 contain a field (not shown) whose initialization state indicates exactly the page attributes that are indicated by the FL field 135 in the legacy CPU 110 according to a legacy memory management protocol. Attribute extension is achieved according to the present invention, however, by providing additional attribute fields within each of the EMA registers 243. Hence, the default initialization state of the each of the EMA registers 243 indicates the very same page attributes as would otherwise be indicated by the FL field 135 in the legacy system 100. Yet, the EMA registers 243 can be written by a newer operating system 225, and thus a number of different page attributes can be provided for virtual pages 236 within a system 200 employing an upgraded operating system 225. The number of different attribute schemes afforded by the present invention is bounded by the number of bits within the TLB entry field that is used as an index into the register array 243 and by the number of EMA registers 243. One skilled in the art will appreciate that all implemented combinations of legacy attributes identified by the FL field 135 in a legacy system 100 must be mapped to corresponding EMA registers 243 within an EMA-enabled system 200. For example, suppose the FL field 135 in the legacy system 100 was a 3-bit field 135 indicating cache policy for a virtual page 136 and that only two cache policies were implemented: cacheable, indicated by a value of 000, and non-cacheable, indicated by a value of 001. Accordingly, the EMA-enabled system 200 must provide at least two EMA registers 243 whose initialization states indicated each of the legacy implemented cache policies. In addition, the EMA register 243 selected by an index value of 000 within the EM/FL field 254 must initialize to indicate cache policy cacheable, and the EMA register 243 selected by an index value of 001 within the EM/FL field 254 must initialize to indicate cache policy non-cacheable.

Hence, when a virtual address 212 is translated by the TLB 215 according to the present invention, the translated physical address is provided to access logic 218 via bus 217 and contents of the EM/FL field 254 are provided to the extended memory attributes logic 241. The extended attributes logic 241 employs all or a portion of the contents of the EM/FL field 254 as an index into the EMA register array 242. In one embodiment, all of the EM/FL field 254 is provided as an index into the EMA array 242. In an alternative embodiment, selected bits of the EM/FL field 254 are provided to index the array 242; remaining bits are interpreted by the external attributes logic 241. Accordingly, the extended memory attributes logic 241 extracts the index bits from the EM/FL field 254 and uses these bits to index a specific EMA register 243 within the array 242. In one embodiment, each EMA register 243 is a 32-bit register. An alternative embodiment comprehends 64-bit EMA registers 243. The specific EMA register 243 comprises a number of extended memory attribute fields (not shown) that prescribe the extended memory properties of the virtual memory page 236 to which the specific EMA register 243 corresponds. These control properties are returned to the extended attribute logic 241 and the extended attribute logic 241 provides these extended control properties, along with any other prescribed page attributes, to the access logic so that the virtual page 236 can be accessed properly.

By providing a configurable set of EMA registers 243 that is external to the TLB 215, where the initialized state of each of the registers 243 indicates corresponding page attributes implemented within a legacy system 100, a CPU 210 according to the present invention can enjoy the benefits of improved virtual page management performance while retaining compatibility with legacy operating systems 125. For example, the block diagram of FIG. 2 shows that the mechanism for extending memory attributes according to the present invention can employ the same TLB architecture 115 as that of FIG. 1 to prescribe a set of virtual page attributes beyond that which the page entries 132 of the legacy computing system 100 are capable of expressing. In addition to cacheability features and read/write controls, the present invention affords designers the opportunity to establish, at the virtual page level, page access protections, extended cache management policies, and ISA mode for all of the data and instructions contained within a virtual page 236.

Figure 3:
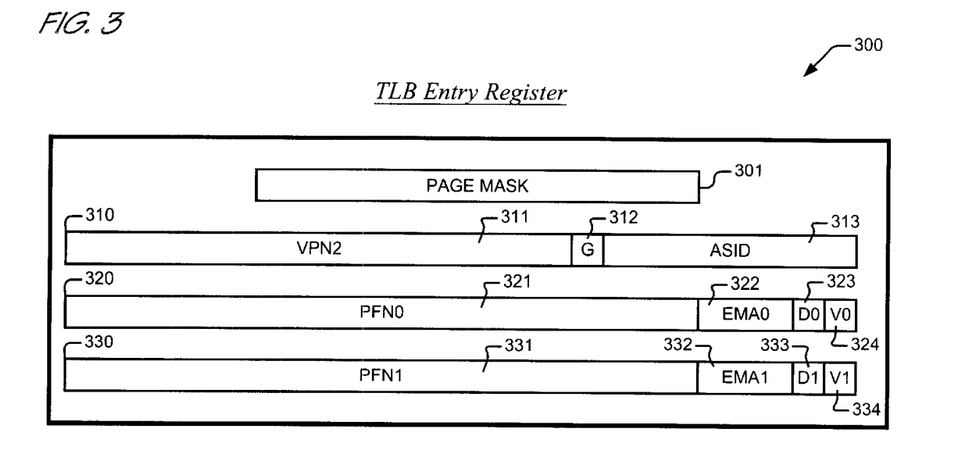
FIG. 3 is a diagram depicting a TLB Entry Register according to the present invention.

Now referring to FIG. 3, a diagram is presented depicting an exemplary TLB entry register 300 according to the present invention, such as the entry register 219 of FIG. 2. The TLB entry register 300 has a page mask field 301, an entryhi field 210, an entrylo 0 field 320, and an entrylo 1 field 330. The entryhi field 310 has a virtual page number (VPN2) sub-field 311, a global (G) sub-field 312, and an application space identification (ASID) sub-field 313. The entrylo fields 320, 330 have corresponding physical frame number (PFN0, PFN1) sub-fields 321, 331, extended memory attributes (EMA0, EMA1) sub-fields 322, 332, dirty (D0, D1) sub-fields 323, 333, and valid (V0, V1) subfields 324, 334. The exemplary TLB entry register 300 shown in FIG. 3 reflects the structure of a TLB 215 according to the MIPS32™ (available from MIPS Technologies, Inc.) architecture, however, one skilled in the art will appreciate from the foregoing discussion that extended memory attribute features for virtually any present day microprocessor architecture can be derived from the TLB entry register 300 discussed herein without significant departure from the scope of the present invention.

In operation, the lower bits of a virtual address generated by address logic according to the present invention are employed as an offset into a virtual page and are not provided to the TLB. In an exemplary embodiment, the virtual address is a 32-bit address comprising a 12-bit offset (i.e., 4KB page size) and a 20-bit virtual page number. Thus, page tables in memory contain entries for all of the virtual page numbers addressable by the CPU. In the exemplary embodiment, every application executing on the CPU is assigned an 8-bit ASID, or process ID. According to the exemplary embodiment, each page table entry that is provided to the TLB entry register 300 maps a concatenation of the application's ASID with the 20-bit virtual page number to a corresponding 20-bit physical frame number, virtual page attributes, and extended page attributes. The VPN2 sub-field 311 of the exemplary entry 300 stores all of the bits of the virtual page number except the least significant bit. Logic within the TLB employs the least significant bit to select one of the two entrylo fields 320, 330. If the least significant bit is a 0, then entrylo 0 320 is selected; if the least significant bit is a 1, then entrylo 1 330 is selected. The global sub-field 312 specifies whether or not an application's ASID is to be used in conjunction with its virtual page number for address translation. Translation that employs an application's ASID enables multiple instances of that application to execute at the same time on the CPU. If G 312 is not asserted, then the ASID sub-field 313 is ignored during address translation. Likewise, the contents of the page mask field 301 are employed to cause corresponding bits of a virtual page number to be ignored (i.e., masked) during translation. For example, in a 32-bit virtual address embodiment according to the exemplary entry 300, the page mask 301 is a 32-bit entity. If the page mask 301 is set to zero, then 4KB virtual memory pages are prescribed. If bits 14–13 of the page mask 301 are set to 1, then 16KB virtual page sizes are prescribed. 64KB page sizes are prescribed by setting bits 16–13 to 1. One skilled in the art will appreciate how larger page sizes can be specified as well by setting bits of the page mask 301. Hence, a virtual page number is concatenated with a corresponding process ID (ASID) and is submitted to a TLB. The TLB then matches the upper bits of the virtual page number with VPN2 311 in accordance with contents of the page mask field 301, and global 312 and ASID sub-fields 313. The least significant bit of the virtual page number selects either entrylo 0 320 or entrylo 1 330.

The entrylo fields 320, 330 provide a physical frame number 321, 331 that is concatenated to the offset for access to physical memory. Memory access is controlled by the EMA, dirty, and valid sub-fields 322-324, 332-334. If the valid sub-field 324, 334 is not asserted, then an exception is indicated because the data in the corresponding entry 300 is not valid. This mechanism is employed to mark a page that is not available for access by the CPU. The dirty sub-field 323, 333 functions to indicate whether or not writes are allowed to a page. Hence, if the dirty sub-field 323, 333 in the entry 300 is asserted, then writes are enabled. Otherwise, writes to this page must be trapped.

Extended memory page attributes for corresponding virtual memory pages are prescribed by contents of the EMA sub-field 322, 332. The initialization states of each of the EMA register that are indexed by the EMA sub-field 322, 332 prescribe corresponding legacy attributes for virtual memory pages in accordance with a legacy operating system protocol. Contents of the EMA register prescribe extended memory attributes as well for associated virtual memory pages, and an EMA-enabled operating system prescribes contents of the EM/FL field such that appropriate extended attributes are selected appropriately for each virtual page within an EMA-enabled computing system. In an embodiment having eight EMA registers in the EMA register file, each of the EMA sub-fields 322, 332 are 3-bit fields.

Figure 4:
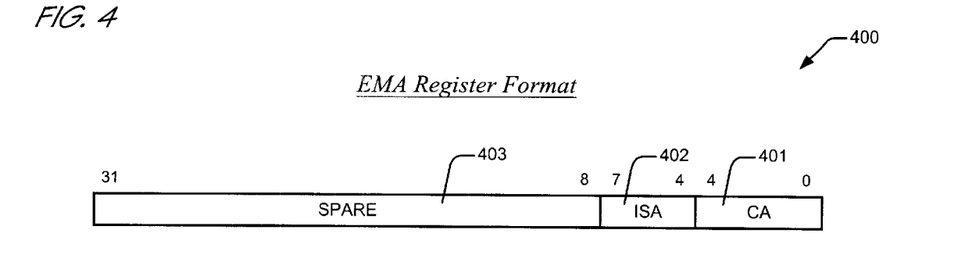
FIG. 4 is a diagram illustrating an extended memory attributes register according to the present invention.

Referring to FIG. 4, a diagram is presented illustrating an extended memory attributes register 400 according to the present invention. The EMA register 400 has a cache attributes field 401, and ISA mode field 402, and a spare field 403. The contents of the cache attributes field 401 prescribe a specific extended cache attributes policy for an associated virtual memory page in accordance with the Table 1.

TABLE 1

Mapping of Cache Attributes

| CA VALUE | CACHE MANAGEMENT POLICY |
| --- | --- |
| 0 | CACHEABLE, NONCOHERENT, WRITE THROUGH, NO WRITE ALLOCATE |
| 1 | CACHEABLE, NONCOHERENT, WRITE THROUGH, WRITE ALLOCATE |
| 2 | UNCACHEABLE |
| 3 | CACHEABLE, NONCOHERENT, WRITE BACK |
| 4 | CACHEABLE, COHERENT, EXCLUSIVE |
| 5 | CACHEABLE, COHERENT, EXCLUSIVE ON WRITE |
| 6 | CACHEABLE, COHERENT, UPDATE ON WRITE |
| 7–31 | RESERVED |

Likewise, the contents of the ISA mode field 402 prescribe a ISA mode for instructions and data within an associated virtual memory page in accordance with the Table 2.

TABLE 2

Mapping of ISA Mode Attributes

| ISA VALUE | ISA MODE |
| --- | --- |
| 0 | ISA containing 32-bit instructions |
| 1 | ISA containing 16-bit instructions |
| 2–7 | RESERVED |

In an embodiment that uses a cache policy field of a legacy TLB as an index into an EMA register array according to the present invention, each of the registers within the array whose index value corresponds to an implemented legacy cache policy must initialize to the legacy cache policy that is associated in a legacy system with the index value.

Figure 5:
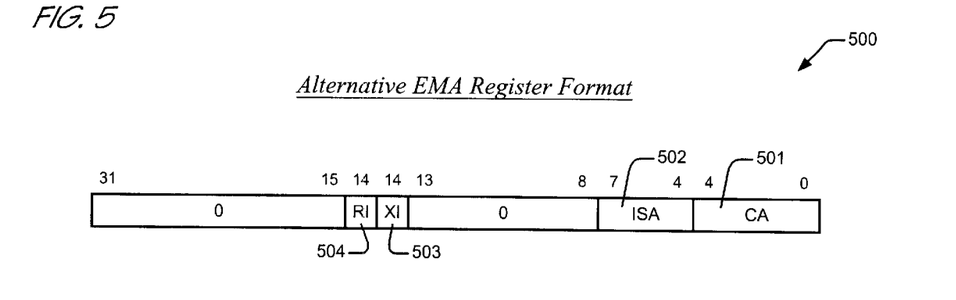
FIG. 5 is a diagram illustrating an alternative embodiment of an extended memory attributes register according to the present invention.

FIG. 5 is a diagram illustrating an alternative embodiment of an extended memory attributes register 600 according to the present invention. The alternative EMA register 500 has a cache attributes field 501, and ISA mode field 502, a read inhibit (RI) field 504, and an execute inhibit (XI) field 503. The contents of the cache attributes field 501 prescribe a specific extended cache attributes policy for an associated virtual memory page like those attributes described with reference to FIG. 4. Likewise, the contents of the ISA mode field 502 prescribe a ISA mode for instructions and data within an associated virtual memory page like those ISA modes described with reference to FIG. 4. In addition, the RI field 504 is asserted to restrict access to the virtual memory page for read accesses. The XI field 503 is asserted to indicate that the associated virtual memory page is restricted to data accesses only. When both RI 504 and XI 503 are asserted, only data write accesses are allowed.

The exemplary EMA register formats described with reference to FIGS. 4 and 5 are provided as illustrations of what extended memory attributes can be prescribed according to the present invention. They are not provided to constrain the numbers or types of attributes that can be prescribed. One skilled in the art will appreciate that the examples of FIGS. 4 and 5 can be enhanced, the size of the fields modified, or the register contents themselves can be encoded in such a manner as to prescribe numerous types and combinations of additional virtual page attributes that have not been discussed herein. Any type of access property, control, feature, or restriction can be prescribed within the EMA registers while allowing a CPU according to the present invention to retain compatibility with a legacy operating system by virtue of the initialization states of each of the EMA registers.

The examples of FIGS. 2 through 5 clearly convey that the properties of virtual memory pages for a computing system can be effectively extended according to the present invention while at the same time preserving backwards compatibility of the computing system with legacy operating system software. Property extension in the presence of compatibility is provided by virtue of an extended memory attributes register array that prescribes the extended properties and provides corresponding legacy properties in an initialized state.

Although the present invention and its objects, features, and advantages have been described in detail, other embodiments are encompassed by the invention as well. In addition to implementations of the invention using hardware, the invention can be embodied in software disposed, for example, in a computer usable (e.g., readable) medium configured to store the software (i.e., a computer readable program code). The program code causes the enablement of the functions or fabrication, or both, of the invention disclosed herein. For example, this can be accomplished through the use of general programming languages (e.g., C, C++, etc.), hardware description languages (HDL) including Verilog HDL, VHDL, AHDL (Altera Hardware Description Language) and so on, or other programming and/or circuit (i.e., schematic) capture tools available in the art. The program code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a core (e.g., a microprocessor) that is embodied in program code and may be transformed to hardware as part of the production of integrated circuits. Also, the invention may be embodied as a combination of hardware and software.

In addition, the present invention has been particularly characterized in terms of a general purpose CPU or microprocessor. This characterization is presented herein as a representative embodiment for the present invention, however, such description should by no means restrict application of the concept of virtual memory property extension. On the contrary, the present invention can be embodied within a graphics processor, a digital signal processor, as well as less commonly known components to include communications processors, video processors, second-tier memory management units, and micro controllers.

Furthermore, the present invention has been specifically presented in terms of a CPU that is capable of implementing certain well-known instruction set architectures contained within the MIPS32™ and MIPS64™ architectures. These exemplary ISAs are employed herein because they provide a recognizable basis for teaching the present invention, however, it should not be construed that application of the present invention is limited to these ISAs. Rather, the present invention contemplates any form of page-based ISA mode distinction extensions within a family of instructions such as those found in the MIPS32™ and MIPS64™ architectures, and the MIPS16™ application specific extension; 16/32-bit processors; MMX™ technology; etc.; as well as distinctions between the ISAs of different manufacturers.

Additionally, the present invention has been described herein in accordance with translation lookaside buffer (TLB) embodiments that consist of entries mapping one virtual page number to two physical page numbers, where such mapping is controlled by the least significant bit of a virtual page number. Although these types of TLBs are commonly encountered within the art, it is also noted that the present invention comprehends other TLB architectures as well. For instance, the present invention can be applied to TLB structures that map a single virtual page number to a single physical frame number as well.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. An apparatus for specifying extended properties for virtual memory pages, the apparatus comprising:
    a translation lookaside buffer (TLB), configured to store a plurality of TLB entries, each of said plurality of TLB entries having an extended memory attributes index field, wherein said extended memory attributes index field prescribes legacy properties according to a legacy memory management protocol, and wherein said legacy properties comprise legacy cache management policies; and
    extended attributes logic, coupled to said TLB, configured to employ said extended memory attributes index field to access one of a plurality of extended memory attributes registers that is external to said TLB, wherein said extended memory attributes index field designates said one of said plurality of extended memory attributes registers, and wherein contents of said one of said plurality of extended memory attributes registers prescribe specific extended properties for a corresponding virtual memory page;
    wherein said plurality of extended memory attributes registers have initialization states that correspond to said legacy properties, and wherein said one of said plurality of extended memory attributes registers indicates an initialization legacy property that corresponds to said extended memory attributes index field.

2. The apparatus as recited in claim 1, wherein said plurality of extended memory attributes registers comprises eight extended memory attributes registers.

3. The apparatus as recited in claim 2, wherein each of said plurality of extended memory attributes registers comprises a 32-bit register.

4. The apparatus as recited in claim 2, wherein each of said plurality of extended memory attributes registers comprises:
    an extended cache coherency attribute field, configured to prescribe one of a plurality of extended cache control policies for accesses to the virtual memory pages; and
    an ISA mode field, configured to prescribe one of a plurality of Instruction Set Architectures associated with the virtual memory pages.

5. The apparatus as recited in claim 4, wherein said plurality of Instruction Set Architectures comprises a first ISA containing 32-bit instructions and a second ISA containing 16-bit instructions.

6. The apparatus as recited in claim 2, wherein each of said plurality of extended memory attributes registers comprises:
    a read inhibit field, configured to specify whether or not the virtual memory pages are configured for read accesses; and
    an execute inhibit field, configured to specify whether or not the virtual memory pages are configured for execution accesses.

7. The apparatus as recited in claim 1, further comprising:
    a configuration register, coupled to said TLB, configured to indicate to an operating system that extended memory functions are available.

8. A mechanism in a microprocessor for enabling a translation lookaside buffer (TLB) to extend the properties of virtual memory pages, the mechanism comprising:
    an extended properties register array, for specifying a plurality of extended virtual page properties; and
    a memory management unit, coupled to said extended properties register array, for accessing the virtual memory pages, said memory management unit comprising:
        TLB entries, for prescribing the properties of the virtual memory pages, wherein an extended memory attributes field within each of said TLB entries designates a corresponding register within said extended properties register array, and wherein said extended memory attributes field specifies legacy virtual page properties according to memory management rules employed by a legacy operating system; and
        extended attributes logic, coupled to said TLB entries, for accessing said corresponding register to determine one of said plurality of extended virtual page properties that applies for accesses to a particular virtual memory page,
    wherein said corresponding register is initialized to indicate specific legacy virtual page properties that correspond to contents of said extended memory attributes field according to said memory management rules.

9. The mechanism as recited in claim 8, wherein said corresponding register comprises:
    an extended cache coherency attribute field, configured to prescribe one of a plurality of extended cache control policies for accesses of said particular virtual memory page; and
    an ISA mode field, configured to prescribe one of a plurality of Instruction Set Architectures associated with said particular virtual memory page.

10. The mechanism as recited in claim 9, wherein said corresponding register comprises:
- a read inhibit field, configured to specify whether or not said particular virtual memory page is configured for read accesses; and
- an execute inhibit field, configured to specify whether or not said particular virtual memory page is configured for execution accesses.

11. The mechanism as recited in claim 8, wherein said extended properties register array comprises eight registers.

12. A computer program product for use with a computing device, the computer program product comprising:
- a computer usable medium, having computer readable program code embodied in said medium, for causing a CPU to be described, said CPU being capable of accessing virtual memory pages according to extended page properties, said computer readable program code comprising:
  - first program code, for describing a translation lookaside buffer (TLB), said TLB configured to store TLB entries, each having an extended page properties field, wherein said extended page properties field, according to a legacy operating system memory management protocol, prescribes page properties;
  - second program code, for describing extended attributes logic, said extended attributes logic configured to employ said extended page properties field to access an extended attribute register that is external to said TLB, wherein contents of said extended attribute register determine said extended page properties for a particular virtual memory page, and wherein said extended attribute register is one of a plurality of extended attribute registers, and wherein said plurality of extended attribute registers is initialized to prescribe said legacy memory attributes according to said extended page properties field; and
  - third program code, for describing a configuration register, wherein contents of said configuration register indicate whether or not said CPU is capable of providing said extended page properties.

13. The computer program product as recited in claim 12, said extended attribute register comprises:
- an extended cache coherency attribute field, configured to prescribe one of a plurality of extended cache control policies for access to said particular virtual memory page; and
- an ISA mode field, configured to prescribe one of a plurality of Instruction Set Architectures associated with accesses to said particular virtual memory page.

14. The computer program product as recited in claim 13, wherein said extended attribute register further comprises:
- a read inhibit field, configured to specify whether or not said particular virtual memory page is configured for read accesses; and
- an execute inhibit field, configured to specify whether or not said particular virtual memory page is configured for execution accesses.

15. A computer data signal embodied in a transmission medium, comprising:
- first computer-readable program code, for describing a translation lookaside buffer (TLB), said TLB configured to store TLB entries, each having an extended page properties field;
- second computer-readable program code, for describing extended memory attributes registers external to said TLB, wherein each of said extended memory attributes registers prescribes a set of extended attributes for accesses to virtual memory pages;
- third computer-readable program code, for describing extended attributes logic, said extended attributes logic configured to employ said extended page properties field to access one of said extended memory attributes registers to determine a specific set of extended attributes whereby a specific virtual memory page is accessed, wherein said extended page properties field specifies legacy attributes for access to said virtual memory pages according to a legacy memory management protocol; and
- fourth computer-readable program code, for describing a configuration register, wherein contents of said configuration register indicate to an operating system that extended attributes features are available for use;
- wherein said extended memory attributes registers are initialized to indicate said legacy attributes according to said legacy memory management protocol, and wherein said one of said extended memory attributes registers is initialized to indicate particular legacy attributes corresponding to contents of said extended page properties field.

16. The computer data signal as recited in claim 15, wherein each of said extended memory attributes registers comprises:
- an extended cache coherency attribute field, configured to prescribe one of a plurality of extended cache control policies for access to said virtual memory pages; and
- an ISA mode field, configured to prescribe one of a plurality of Instruction Set Architectures associated with accesses to said virtual memory pages.

17. The computer data signal as recited in claim 15, wherein each of said extended memory attributes registers comprises:
- a read inhibit field, configured to specify whether or not said virtual memory pages are configured for read accesses; and
- an execute inhibit field, configured to specify whether or not said virtual memory pages are configured for execution accesses.

18. A method in a microprocessor for extending the properties of virtual memory pages over that provided for by existing translation lookaside buffer (TLB) entries, the method comprising:
- designating an existing field within each of the entries as an extended properties register index field and providing an array of extended properties registers external to the TLB that are indexed by the extended properties register index field;
- employing contents of the extended properties register index field to access a particular extended properties register within the array to extend the properties of a particular virtual memory page, wherein said employing comprises:
  - first prescribing, within a first field of the particular extended properties register, an extended cache control policy for accesses to the particular virtual memory page; and
  - second prescribing, within a second field of the particular extended properties register, an Instruction Set Architecture to be used for accesses to the particular virtual memory page;

initializing the array of extended properties registers so that they prescribe legacy properties as prescribed by contents of the extended properties register index field according to a legacy memory management protocol; and providing a configuration register in the microprocessor to indicate to an operating system that extended virtual page management features are available for employment.

19. The method as recited in claim 18, wherein said employing comprises:

prescribing, within a field of the particular extended properties register, whether or not read accesses or execution accesses to the particular virtual memory page are prohibited.

* * * * *